United States Patent [19]

Miyazaki et al.

[11] 4,101,194
[45] Jul. 18, 1978

[54] SCREEN MICROSCOPE WITH VARIABLE ILLUMINATION

[75] Inventors: Kensaku Miyazaki, Machida; Toshio Shinohara, Tokyo, both of Japan

[73] Assignee: Olympus Optical Co., Ltd., Tokyo, Japan

[21] Appl. No.: 705,172

[22] Filed: Jul. 14, 1976

[30] Foreign Application Priority Data

Aug. 27, 1975 [JP] Japan .............................. 50-102886

[51] Int. Cl.² ....................... G02B 21/36; G02B 21/56
[52] U.S. Cl. .......................................... 350/9; 350/34; 350/120; 353/39
[58] Field of Search ............. 350/9, 87, 160 LC, 117, 350/120, 17, 34; 353/39; 240/2 MA

[56] References Cited

U.S. PATENT DOCUMENTS

| 2,209,532 | 7/1940 | Michel | 350/9 |
| 2,518,252 | 8/1950 | Reardon et al. | 350/9 X |
| 2,525,596 | 10/1950 | Finn | 350/120 |
| 3,551,019 | 12/1970 | Michel | 350/87 X |
| 3,674,338 | 7/1972 | Cartmell et al. | 350/160 LC X |
| 3,736,041 | 5/1973 | McArthur | 350/87 |

FOREIGN PATENT DOCUMENTS 788,270 12/1957 United Kingdom .................. 353/39

*Primary Examiner*—Jon W. Henry
*Attorney, Agent, or Firm*—Cushman, Darby & Cushman

[57] ABSTRACT

A screen microscope comprising a projection screen arranged on an arm of the microscope and a plural number of reflecting mirrors arranged in the arm and arranged to project an image of an object obtained by the microscope onto the screen through the reflecting mirrors. The screen microscope is arranged so that the observing direction by the screen is approximately same as the observing direction through an eyepiece.

3 Claims, 11 Drawing Figures

SCREEN MICROSCOPE WITH VARIABLE ILLUMINATION

BACKGROUND OF THE INVENTION

1. Field of the Invention

The present invention relates to a screen microscope and, more particularly, to a screen microscope arranged chiefly for the purpose of observing an image projected on a screen and enabling to observe also by an eyepiece.

2. Description of the Prior Art

For medical examination, for example, cytodiagnosis, examination of feces, examination of urine, examination of blood corpuscle, etc., it is necessary to examine for a long time by means of a microscope. Therefore, examiners who perform such examinations suffer from considerable asthenopia which often causes various lesions. As a method for solving such problem, it is known to observe by projecting the image obtained by the microscope into a screen.

As the devices for observing the image obtained by the microscope by projecting it onto a screen, screen attachments for microscope as shown in FIG. 1 are known. Most of such screen attachments for microscope are arranged to mount a projection screen 3, instead of a photographing device, onto a photo-tube 2 of the microscope 1 or arranged to dismount the microscope tube and to mount the projection screen instead of it.

In case of such known attachments, however, the position of the projection screen 3 becomes high. When, therefore, moving a stage or operating a focusing part by observing the image projected onto the screen 3a, it is rather difficult to perform such operations and these known attachments are not suited for observation for a long time. Moreover, when alternately repeating to observe the image of the object by an eyepiece 4 and to observe the image of the object projected onto the screen 3a by using the above-mentioned known attachments, the height of the observing point by the eyepiece is quite different from the height of the observing point by the screen and it is very inconvenient. Moreover, in case of the screen attachment for microscope as shown in FIG. 1 for which the projection screen is to be interchanged with the photographing device, it is necessary to interchange the screen attachment with the photographing device every time when it is desired to record the observed image and it is also very inconvenient.

SUMMARY OF THE INVENTION

It is, therefore, a primary object of the present invention to provide a screen microscope for which a projection screen is mounted to an arm of the microscope so that it is possible to observe the image of the object projected onto the screen and at the same time to observe the image of the object through an eyepiece.

Another object of the present invention is to provide a screen microscope for which the height of the projection screen mounted to the arm is made approximately same as the height of the eyepiece so that it is convenient for observing alternately by the screen and eyepiece.

Still another object of the present invention is to provide a screen microscope in which the projection screen is arranged at the front of the microscope body so that it is convenient for alternately observing the image of the object projected onto the screen and the image through the eyepiece.

DETAILED DESCRIPTION OF THE PREFERRED EMBODIMENTS

Figure 2:
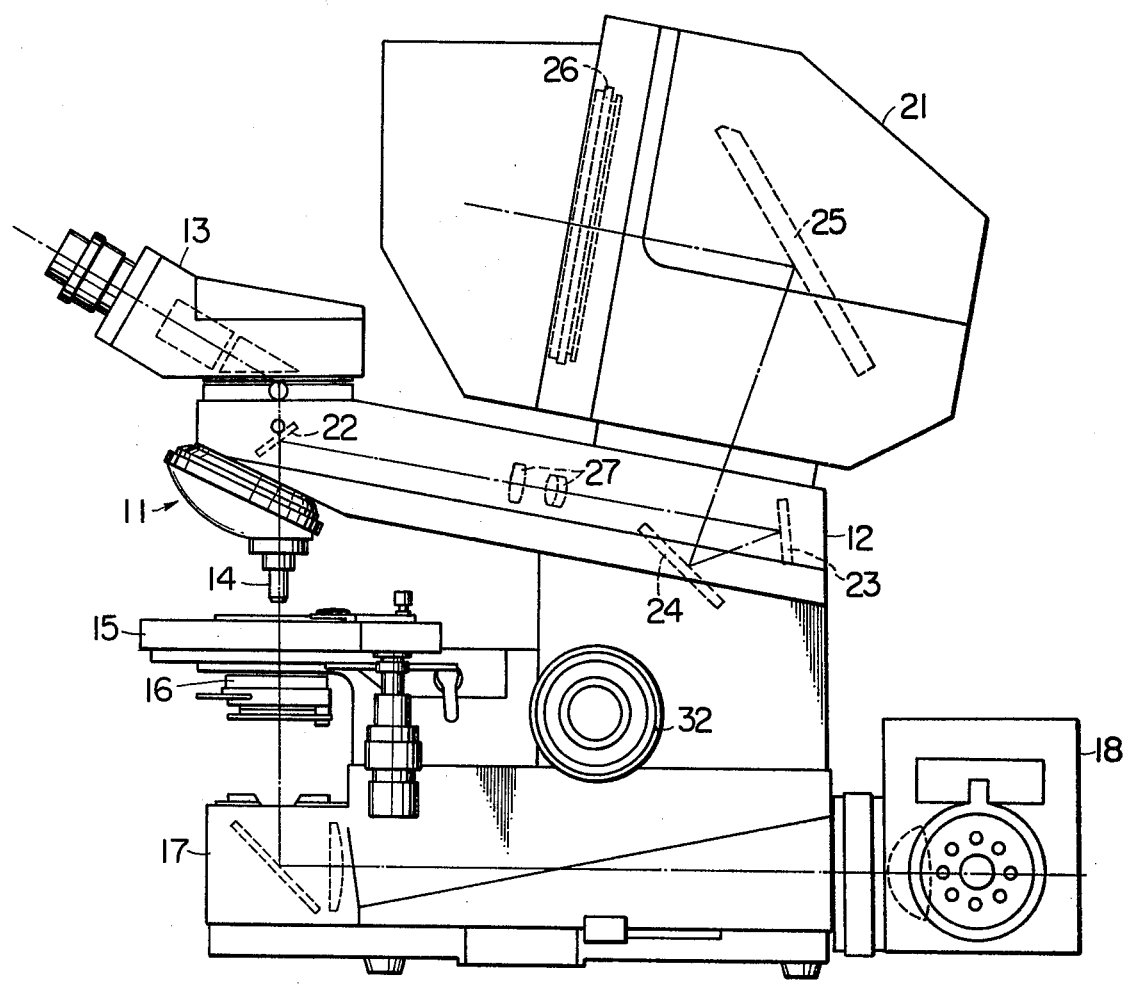
FIG. 2 shows a side view of Embodiment 1 of the present invention.

FIG. 2 shows Embodiment 1 of the screen microscope according to the present invention. In this figure, numeral 11 designates a microscope, numeral 12 designates an arm, numeral 13 designates an eyepiece, numeral 14 designates an objective, numeral 15 designates a stage, numeral 16 designates a condenser, numeral 17 designates a microscope base, and numeral 18 designates a light source. The above-mentioned members are substantially same as corresponding members of known microscopes. Numeral 21 designates a projection screen means which is fixed onto the arm 12. Numeral 22 designates a first reflecting mirror arranged in the arm 12 at a position just below the portion where the eyepiece 13 is mounted so that said first reflecting mirror can be aligned with and removed from the optical axis of the optical system of the microscope. Numeral 23 designates a second reflecting mirror arranged in the arm 12 for the purpose of further reflecting the light from the object to be observed which is already reflected by the first reflecting mirror 22. Numeral 24 designates a third reflecting mirror for further reflecting the light from the object which is reflected by the second reflecting mirror 23 so that said light is directed upward, i.e., directed toward the projection screen means 21. Numeral 25 designates a fourth reflecting mirror arranged in the projection screen means 21 for the purpose of projecting the light from the object onto a screen 26.

By the screen microscope according to the present invention described in the above, the object is observed as explained below. When the first reflecting mirror 22 is located at the position shown by broken lines in FIG. 3 which shows a part of the optical system of the microscope, the light from the object which passed through the objective 14 is at first reflected by the first reflecting mirror 22, further reflected by the second through fourth reflecting mirrors and focused onto the screen 26 as it is evident from FIG. 2. At that time, in order to arrange so that the image of the object obtained by the microscope objective 14 is properly focused on the screen 26 when it is projected, a projecting optical system 27 may be arranged at an adequate position in the optical path from said first reflecting mirror 22 to the screen 26 as shown in FIG. 2. Thus, it is possible to observe the object by an enlarged image projected onto the screen 26.

Figure 1:
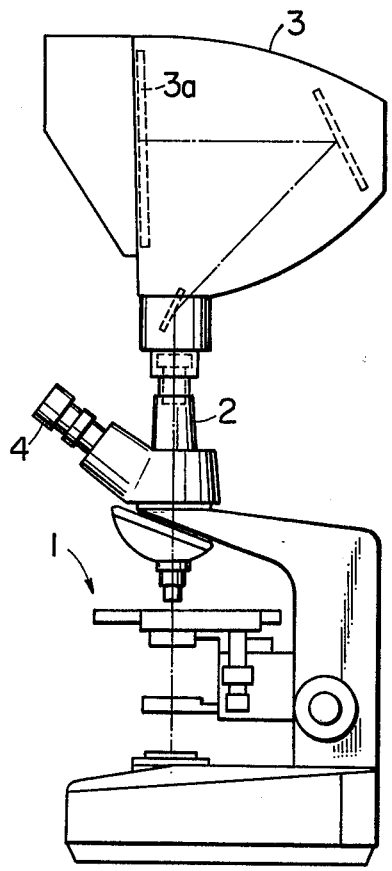
FIG. 1 shows a side view of a known screen attachment for microscope.
Figure 3:
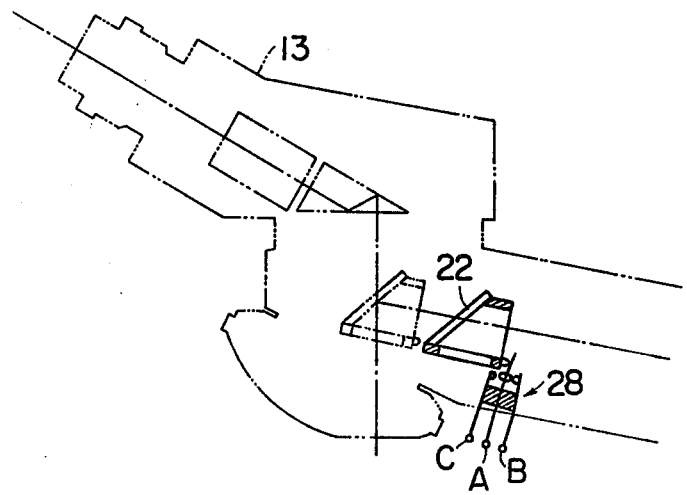
FIG. 3 shows arrangement of a change-over switch to be used in the present invention.

On the other hand, when the first reflecting mirror 22 is moved to the position shown by solid lines in FIG. 3, the light from the object which passed through the objective 14 is directed toward the eyepiece 13 and it becomes possible to observe the image of the object by the eyepiece 13.

Figure 4:
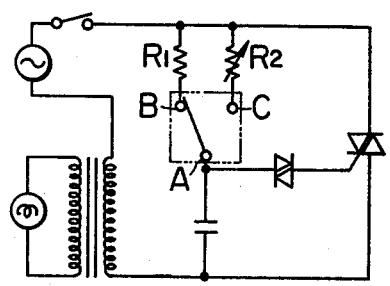
FIG. 4 shows a circuit diagram of a power source for illuminating light source to be used in the present invention.

When observing the image of the object by projecting it onto the screen or by the eyepiece as described in the above, it is preferable to provide a switch mechanism 28 in the arm at a position near the optical path as shown in FIG. 3 and vary the intensity of the light from the illuminating light source by changing over the switch at the same time as the optical path is changed over by moving the first reflecting mirror 22. To explain this arrangement, reference is made to a circuit shown in FIG. 4. When the first reflecting mirror is at the position shown by solid lines, a contact A is connected to a contact B and the intensity of the light from the light source is reduced by a resistor $R_1$ having a larger resistance value and thereby becomes suitable for observation by the eyepiece. On the other hand, when the first reflecting mirror 22 is in the position shown by broken lines, the contact A is connected to a contact C. Therefore, by means of a variable resistor $R_2$ for which the resistance value is lower, the intensity of the light from the light source is made higher and becomes suitable for observing the image projected on the screen. Moreover, by varying the resistance value of the variable resistor $R_2$, it is also possible to adjust the intensity of the light from the light source to the value with which the image projected on the screen can be observed most easily. Besides, the resistor $R_1$ may be also arranged as a variable resistor. When the resistor $R_1$ is arranged as a variable resistor, it is possible to observe through the eyepiece by adjusting the intensity of the light from the light source to the value most suitable for magnification of each objective to be used. Moreover, when a photographing device is mounted instead of the eyepiece, it is also possible to adjust the intensity of light to the value most suitable for photographing.

Figure 5:
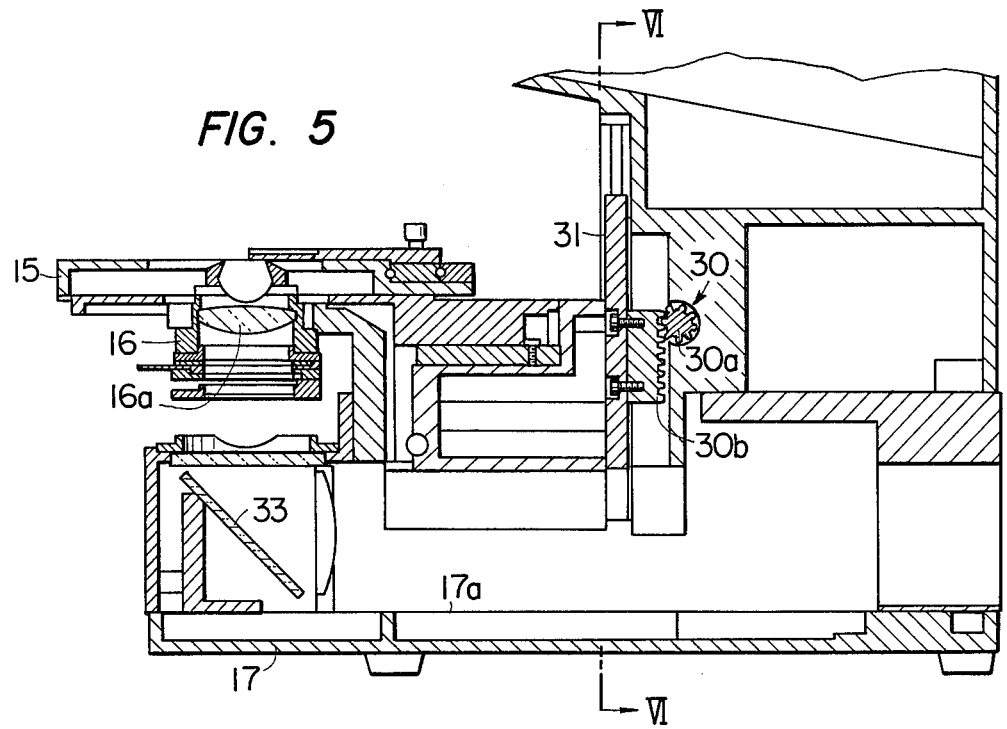
FIG. 5 shows a sectional view of a stage elevating mechanism and microscope base of Embodiment 1.
Figure 6:
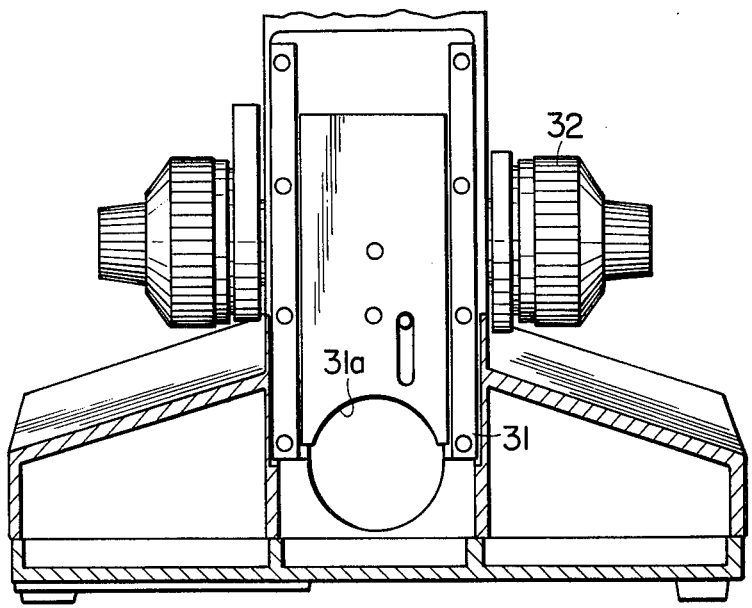
FIG. 6 shows a sectional view taken along the line VI—VI in FIG. 5.

Now, FIG. 5 shows a sectional view of the microscope base of the screen microscope according to the present inventin and FIG. 6 shows a sectional view taken along the line VI—VI in FIG. 5. In these figures, numeral 30 designates a stage elevating mechanism for vertically moving a moving member 31 to which the stage 15, condenser 16, etc. are fixed. The stage elevating mechanism 30 comprises a pinion 30a, a rack 30b meshing with the pinion 30a and mounted to the moving member 31 and so forth. The stage 15, condenser 16, etc. are integrally moved upward and downward by operating a handle 32 to rotate the pinion 30a and to thereby move the rack 30b and moving member 31 upward and downward. A space 17a in the microscope base 17 of the microscope body serves as the passage of the illuminating light from the illuminating light source. That is, the illuminating light from the illuminating light source 18 is reflected by a reflecting mirror 33 after passing through the space 17a and, then, illuminates the object by means of the condenser lens 16a. As the moving member 31 to which the stage 15, condenser 16, etc. are fixed is partially inserted into the microscope base 17 as shown in FIG. 16, the stage 15 and condenser 16 are arranged at a comparatively low position. The moving member 31 has a semicircular cut portion 31a at its lower end. Therefore, the moving member 31 does not obstruct the illuminating light, which passes in the microscope base 17, even when the moving member 31 is lowered to move the stage 15, condenser 16, etc. downward though the moving member 31 is arranged at a low position by partially inserting a part thereof into the microscope base 17 as described in the above.

Figure 7:
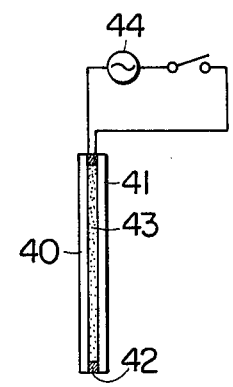
FIG. 7 and 8 respectively show examples of the projection screen.
Figure 8:
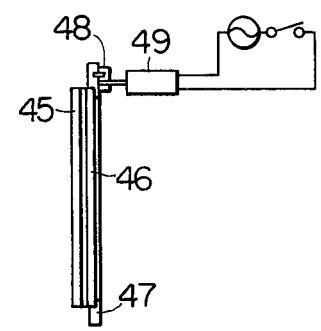

FIGS. 7 and 8 respectively show examples of construction of the screen to be used in the projection screen means 21. FIG. 7 shows an example of screen for which a liquid crystal cell is utilized. Here, numrals 40 and 41 respectively designate electrode plates each of which is made of a glass plate having a transparent electrode provided on its surface. Numeral 42 designates a spacer, numeral 43 designates liquid crystal enclosed in the space formed between both electrode plates 40 and 41, and numeral 44 designates a power source. When a voltage is imposed across the electrodes plates 40 and 41, the liquid crystal 43 scatters light and, therefore, the liquid crystal cell functions like screen in general. The example of the screen shown in FIG. 8 comprises two screen members arranged in parallel with each other, one of said screen members being arranged to be oscillated within the plane which includes said screen member. In FIG. 8, numeral 45 designates a fixed screen member made of frosted glass plate or the like and fixed for example to the frame of the projection screen means. Numeral 46 designates an oscillating screen member also made of frosted glass plate or the like. Numeral 47 designates a screen frame to which the oscillating screen member is mounted. Numeral 48 designates an eccentric cam fixed to the screen frame 47 and numeral 49 designates a motor. When the motor 49 is operated, the oscillating screen member 46 is oscillated within the plane which includes the oscillating screen member 46, i.e., within the plane in parallel with the fixed screen member 45.

Figure 9:
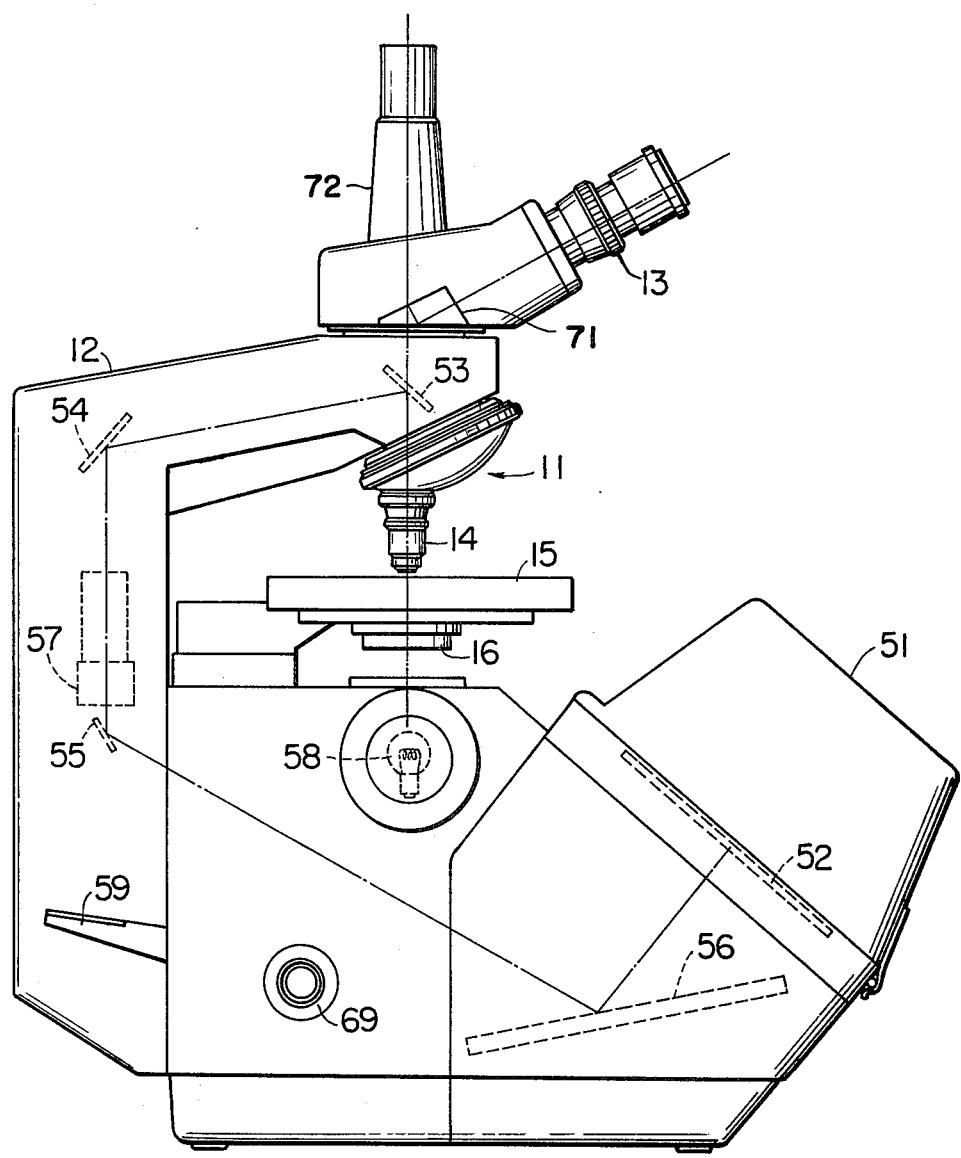
FIG. 9 shows a side view of Embodiment 2 of the present invention.
Figure 10:
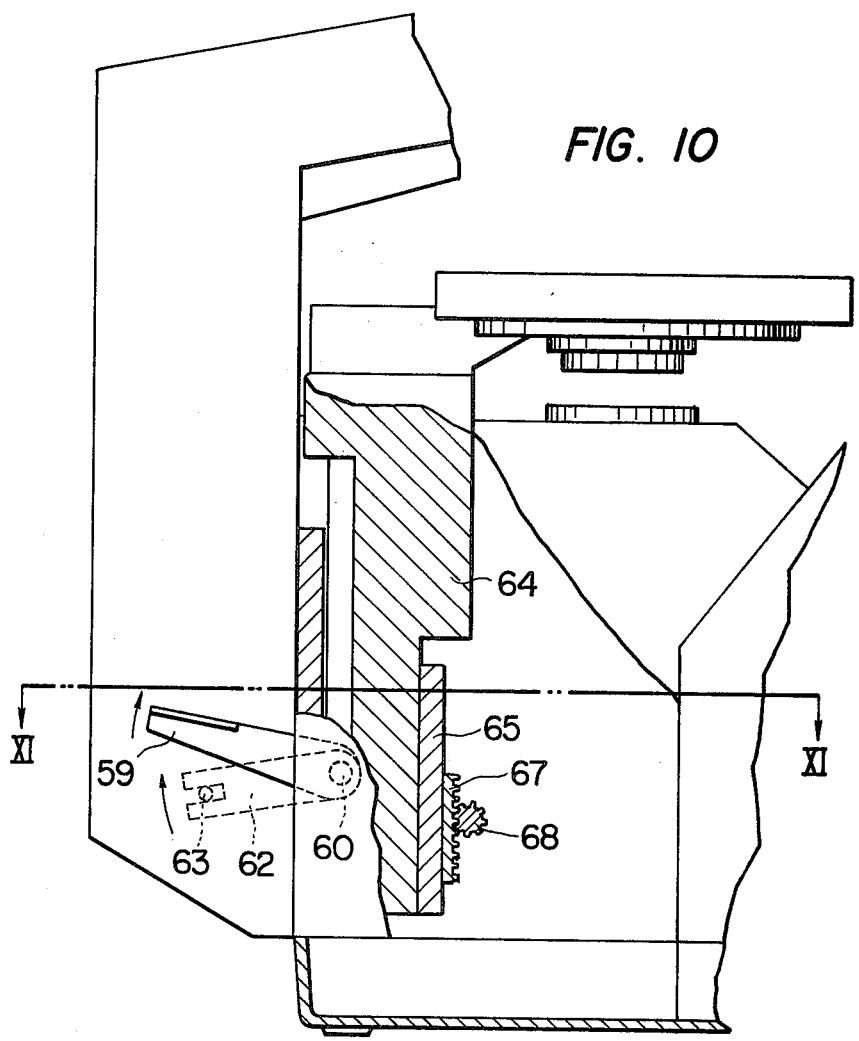
FIG. 10 shows a partially broken side view showing an arm elevating mechanism and stage elevating mechanism of Embodiment 2.
Figure 11:
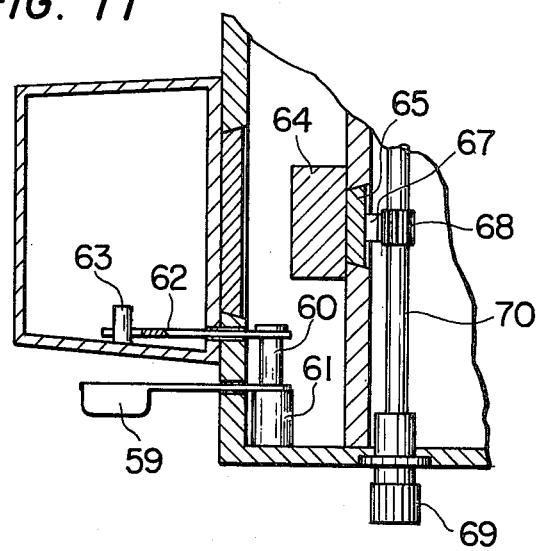
FIG. 11 shows a sectional view taken along the line XI—XI in FIG. 10.

Now, FIG. 9 shows Embodiment 2 of the screen microscope according to the present invention. The largest difference of Embodiment 2 from Embodiment 1 is that the projection screen means is provided to the microscope base. Therefore, those members such as the arm 12, eyepiece 13, objective 14, stage 15, condenser 16, etc., which are mounted to the microscope body 11, are substantially same as those of Embodiment 1 and are designated by the same numerals. In FIG. 9, numeral 51 designates the projection screen means provided at the lower part of the microscope and comprising a screen 52. As the screen 52, any suitable screen may of course by used including the screens constructed as shown in FIGS. 7 and 8. Numeral 53 designates a reflecting mirror arranged so that it can be aligned with and removed from the optical axis of the objective 14. Numerals 54, 55 and 56 respectively designate reflecting mirrors arranged in the arm 12 and numeral 57 designates a projecting optical system. The light from the objective 14 reflected by the reflecting mirror 53 is projected onto the screen 52 of the projection screen means 51 by means of said reflecting mirrors 54, 55 and 56 and projecting optical system 57. Numeral 58 designates a light source lamp arranged below the condenser 16. Numeral 59 designates a lever for moving the arm 12 upward and downward in respect to the microscope body. FIG. 10 shows an arm elevating mechanism for the arm 12 to be operated by the lever 59 and stage elevating mechanism for moving the stagee 15 and condenser 16 upward and downward. FIG. 11 shows a sectional view taken along the line XI—XI in FIG. 10. In these figures, numeral 60 designates a shaft to which the lever 59 is fixed. The shaft 60 is rotatably mounted to a mounting member 61, which is fixed to the microscope body, so that the shaft 60 rotates when the lever 59 is operated. Numeral 62 designates another lever having one end fixed to the shaft 60 and the other end connected to a pin 63, which is fixed to the arm 12. When, therefore, the arm 59 is moved in the direction of the arrowhead, the end of the lever 62 also moves in the direction of the arrowhead and the arm 12 moves upward. Numeral 64 designates a supporting member to which the stage 15 and condenser 16 are fixed. Numeral 65 designates a dovetail fixed to the supporting member 64, numeral 67 designates a rack mounted to the dovetail 65, and numeral 68 designates a pinion mounted to a shaft 70, to which a handle 69 is fixed, and meshing with the rack 67. When the handle 69 is rotated, the pinion 68 rotates, the dovetail 65 slides upward and downward in respect to the microscope body together with the rack 67 and, consequently, the supporting member 64 moves upward and downward together with the stage 15 and condenser 16. Besides, in FIG. 9, numeral 71 designates a prism which is movably arranged and numeral 72 designates a photo-tube for photographing.

The function of Embodiment 2 is as explained below. That is, when the reflecting mirror 53 is aligned with the optical axis of the objective 14, it is possible to observe the image of the object by projecting it onto the screen 52 by means of the reflecting mirrors 54, 55 and 56 and projecting optical system 57. When the reflecting mirror 53 is moved from the optical axis of the objective 14, it is possible to observe the object through the eyepiece. Moreover, when a photographing device is mounted to the photo-tube 72 and, at the same time, the prism 71 moved in the direction vertical to FIG. 9, it is possible to photograph the object. Besides, when the objective 14 is moved away from the surface of the stage 15 by operating the lever 59 to move the arm 12 upward, it is possible to insert and exchange the object quite easily.

As explained in the above, the screen microscope according to the present invention is arranged so that the height of the screen is low and, therefore, the observer can observe the object in a comfortable posture. Moreover, as the height of the screen is approximately same as the height of the eyepiece, the height of the observer's eyes when observing the image on the screen becomes approximately same as that when observing through the eyepiece. Therefore, for the observer, it is very easy to change over between observation by the screen and observation by the eyepiece. In case of Embodiment 2, the screen is provided at a position lower than the eyepiece. As, however, the observer's viewing direction for observing the image on the screen is approximately same as his viewing direction for observing through the eyepiece, it is also very easy to change over between observation by the screen and observation by the eyepiece. Moreover, the stage, handles, etc. are also provided at lower positions and the handles are provided at such position which is convenient for handle operation in relation to the position of the observer's eyes. Therefore, the observer can operate the handles by observing the object in a comfortable posture. Besides, as the eyepiece is arranged so that it will not obstruct the observation of the screen, it is not necessary to mount and dismount the eyepiece every time when changing over between observation by the eyepiece and obseervation of the image on the screen. Furthermore, when it is so arranged that the arm can be moved upward and downward in respect to the microscope body as illustrated by Embodiment 2, it is possible to insert and exchange the object very easily.

When a screen as shown in IG. 7 or FIG. 8 is used in the projection screen means, high resolving power is assured and it is possible to observe in favourable condition free from glare. As the moving member supporting the stage, condenser, etc. is inserted into the microscope base, the stage position is low. Therefore, it is very convenient for inserting and exchanging the object, and the observer will not get tired even when he observes many different objects for a long time. Moreover, the construction in which the height of the stage etc. is low is advantageous also for safety of the device itself.

We claim:

1. A screen microscope comprising an arm mounted to a microscope body, an objective mounted to said arm, an eyepiece arranged on said arm, a projection screen means having a screen and arranged on said arm adjacent to said eyepiece, a movable reflecting mirror arranged in said arm so that said movable reflecting mirror can be aligned with and removed from the optical axis of said objective, other reflecting mirrors arranged in said arm and arranged to direct the light passed through said objective and reflected by said movable reflecting mirror toward said screen, an illuminating light source mounted to said microscope body, and a change-over switch provided in said arm and arranged so that said change-over switch is changed over in combined operation with movement of said movable reflecting mirror for aligning it with and removing it from the optical axis of said objective, said screen microscope being arranged to vary the intensity of light from said illuminating light source by change over of said change-over switch.

2. A screen microscope according to claim 1, in which said screen is arranged as a liquid crystal cell comprising two electrode plates each provided with a transparent electrode on a surface thereof, liquid crystal enclosed in the space between said electrode plates, and an electric power source for imposing a voltage on said electrodes.

3. A screen microscope according to claim 1, in which said screen comprises a fixed screen member and an oscillating screen member arranged in parallel with said fixed screen member and arranged to oscillate in a plane including said oscillating screen member and in parallel with said fixed screen member.

* * * * *